United States Patent [19]

Simmons

[11] Patent Number: 5,398,975
[45] Date of Patent: Mar. 21, 1995

[54] COMPOSITE THREADED PIPE CONNECTORS AND METHOD

[75] Inventor: Pat Simmons, Mineral Wells, Tex.

[73] Assignee: Centron Corporation, Mineral Wells, Tex.

[21] Appl. No.: 851,089

[22] Filed: Mar. 13, 1992

[51] Int. Cl.[6] ............................................. F16L 15/00
[52] U.S. Cl. ................................. 285/93; 285/390; 285/333
[58] Field of Search ............... 285/93, 390, 333, 334; 411/411

[56] References Cited

U.S. PATENT DOCUMENTS

| | | |
|---|---|---|
| 3,202,560 | 8/1965 | Michael . |
| 3,381,715 | 5/1968 | Michael . |
| 3,381,716 | 5/1968 | Michael . |
| 3,483,896 | 12/1969 | Grosh . |
| 4,106,797 | 8/1978 | Michael . |
| 4,138,285 | 2/1979 | Michael . |
| 4,325,766 | 4/1982 | Michael . |
| 4,349,910 | 9/1982 | Belz ........................................ 285/93 |
| 4,508,855 | 4/1985 | Peters . |
| 4,582,350 | 4/1986 | Okajima ................................. 285/390 |
| 4,943,094 | 7/1990 | Simmons ............................... 285/333 |
| 4,999,389 | 3/1991 | Ariannejad . |
| 5,106,130 | 4/1992 | Ellsworth et al. ..................... 285/92 |
| 5,127,783 | 7/1992 | Moghe et al. ......................... 411/411 |
| 5,186,500 | 2/1993 | Folkers .................................. 285/423 |
| 5,213,374 | 5/1993 | Taniguchi et al. ................... 285/390 |
| 5,233,737 | 8/1993 | Policelli .............................. 285/390 |
| 5,234,765 | 8/1993 | Taylor et al. ........................ 285/149 |

Primary Examiner—Eric K. Nicholson
Attorney, Agent, or Firm—Crutsinger & Booth

[57] ABSTRACT

A composite tubular such as a pipe joint and method of forming the composite tubular is provided in which one of the threaded connectors of the tubular has a composite layer of carbon fiber reinforced plastic formed thereon. The body of the tubular or pipe joint is preferably formed of a composite material such as fiberglass reinforced plastic. The connectors of tubulars may be threaded together with a suitable thread sealant to provide a pressure tight seal in the connection. The pressure tight seal may be formed over a wide range of torque values, therefore, the tubular may be made-up to position rather than torque to form a pressure-tight seal and without galling the threads of the connectors. The layer of carbon and resin also reduces or eliminates galling of the threads and reduces thread wear, therefore, many make-and-break cycles are possible without excessive thread wear.

6 Claims, 3 Drawing Sheets

COMPOSITE THREADED PIPE CONNECTORS AND METHOD

TECHNICAL FIELD

This invention relates to threaded pipe connectors for composite tubulars such as pipe joints. The invention also relates to a method of making such pipe connectors. More particularly, the invention relates to a pipe connection that can form a pressure tight seal over a wide range of torque values including high torque values without galling of the threads.

BACKGROUND OF THE INVENTION

In the past, tubulars, such as pipe joints for use in oil fields, were constructed from metallic materials. More recently, tubulars also have been formed of composite materials such as fiberglass reinforced plastic to take advantage of the special characteristics of such composite materials. For example, composite materials are more inert than metallic materials to corrosive attack.

Pipe joints used in and around oil wells should be sufficiently durable to withstand rough handling and abuse. Whether the pipe joints are suspended in the well or used above ground, the pipe joints and connectors of the pipe joints must be strong and rugged. The connectors of the pipe joints should be able to provide a reliable seal under a variety of harsh environments such as exposure to high temperatures, high pressures, stresses, and corrosive agents.

The typical threaded composite pipe joint is designed so that when the joints are made-up (screwed together), the joints are rotated to a certain torque to join the tubulars together so that the tapered threads form a pressure tight seal. But during make-up the pipe joint is often subjected to excessive torque, which can cause damage to the threads of the connectors of the pipe joints. This damage is referred to as galling of the threads.

Galling of the threads compromises the seal and weakens the strength of the connection between the tubulars. For example, a typical composite pipe connector for a three-inch pipe may be threaded together with torque in the range of one-hundred-and-seventy-five (175) foot-pounds to two-hundred-and-seventy-five (275) foot-pounds. Lower torque does not provide a pressure tight seal; higher torque results in galling of the threads, which causes a loss of seal efficiency.

Galling also causes problems during break-out (unscrewing) of the pipe joint. Galling may make break-out difficult or impossible and often prevents the connectors of the pipe joint from being made-up again, which renders the affected pipe joints unusable. Galling is particularly detrimental to down-hole tubing, which often undergoes multiple make-ups and break-outs during its lifetime. These multiple make-ups and break-outs can also result in thread wear that is detrimental to the useful life of down-hole tubing.

SUMMARY OF THE INVENTION

This invention relates to the tapered threaded connectors of a composite tubular such as a pipe joint. The threaded pin (male connector) threads into a threaded box (female connector) of another composite pipe joint, thereby forming a connection between the two pipe joints. This invention also relates to methods of making threaded connectors of a composite pipe joint.

According to the invention, the tubular body of a pipe joint is formed of composite material. One end of the tubular body is formed with a connector having threads formed thereon. A layer of carbon fiber reinforced plastic is formed on the threads of the connector. The layer of carbon fiber reinforced plastic may be thin, substantially conforming to the surface contour of the threads of the connector, or the layer may be thick, forming the threads of the connector. The layer of carbon fiber reinforced plastic is formed with carbon fiber wetted with resin. The resin typically includes a curing agent for hardening the resin into a plastic material.

According to one aspect of the invention, the layer of carbon fiber reinforced plastic is formed on the threads of the female connector. To form the layer of carbon fiber reinforced plastic on the threads on the female connector, a removable tubular mandrel having male threads formed at one end is rotated about its axis while carbon fibers wetted with resin are wound onto the threads of the mandrel to form a layer. The layer of carbon fibers can be thin, or it can be built up to completely fill the grooves of the threads on the mandrel. Then glass fibers, for example, are wetted with resin and wound over the layer of carbon fibers and over the length of the mandrel to form a layer of a predetermined thickness. Such layer of glass fibers and resin forms the composite body of the female connector and the composite body of the tubular. Thereby, the mandrel serves as the form for the threads of the female connector and the body of the tubular. The complete tubular is then properly cured, and the mandrel is removed from the cured tubular. A male connector may be formed at the other end of the tubular to complete the pipe joint. Preferably, the male connector is formed by machining the composite body of the tubular.

Another method of forming the layer of carbon fiber reinforced plastic on the threads of the female connector involves preforming a sleeve of carbon fiber reinforced plastic. A removable tubular mandrel having male threads is rotated about its axis while carbon fibers wetted with resin are wound onto the threads of the mandrel to form a layer. The layer of carbon fibers can be thin, or it can be built up to completely fill the grooves of the threads on the mandrel. The layer of carbon fibers and resin is then properly cured to form a sleeve. The outer walls of the sleeve are sandblasted, machined, or otherwise textured so that the sleeve will bond to resin material. The completed sleeve is removed from the mandrel. The preformed sleeve of carbon fiber reinforced plastic is then threaded onto a mandrel having male threads at one end. Glass fibers, for example, are wetted with resin and wound over the preformed sleeve of carbon fiber reinforced plastic and over the length of the mandrel to form a layer of a predetermined thickness. Such layer of glass fibers and resin forms the composite body of the female connector and the composite body of the tubular. The complete tubular is properly cured, and the mandrel is removed from the cured tubular. A male connector may be formed at the other end of the tubular to complete the pipe joint. Preferably, the male connector is formed by machining the composite body of the tubular.

According to another aspect of the invention, the layer of carbon fiber reinforced plastic is formed on the threads of the male connector. To form the layer of carbon fiber reinforced plastic on the threads on the male connector, a removable tubular mandrel is rotated about its axis while fibers, such as glass fibers, are wetted with resin and wound over the length of the mandrel to form a layer of a predetermined thickness. This layer of fibers forms the composite body of the tubular. A female connector may be formed at one end of the tubular by conventional methods. Thereafter, carbon fibers are wetted with resin and wound over the first layer of fibers and resin at one end of the mandrel. The layer of carbon fibers is built up to a predetermined thickness. The complete tubular is properly cured, and the tubular is removed from the mandrel. The layer of carbon fiber reinforced plastic formed at one end of the tubular is formed into the male connector. Preferably, the threads of the male connector are formed by machining into the carbon fiber reinforced plastic material.

Another method of forming the layer of carbon fiber reinforced plastic on the threads of the male connector involves preforming a sleeve of carbon fiber reinforced plastic. A removable tubular mandrel is rotated about its axis while carbon fibers wetted with resin are wound onto the mandrel to form a layer. The layer of carbon fibers and resin is then properly cured to form a sleeve. The outer walls of the sleeve are machined to form the threads of a male connector. The inner walls of the sleeve are sandblasted, machined, or otherwise textured so that the sleeve will bond to resin material. The completed sleeve is removed from the mandrel. One end of a composite tubular is machined or otherwise formed to correspond to the inner walls of the sleeve. The preformed sleeve of carbon fiber reinforced plastic is then placed over the end of the composite tubular and the sleeve is bonded to the tubular, thereby forming the male connector on the tubular.

BRIEF DESCRIPTION OF THE DRAWINGS

The details of the construction of the preferred embodiment of the present invention and its advantages will be apparent to those skilled in the art from the following description and the accompanying drawings, in which.

DESCRIPTION OF THE PREFERRED EMBODIMENTS

Figure 1:
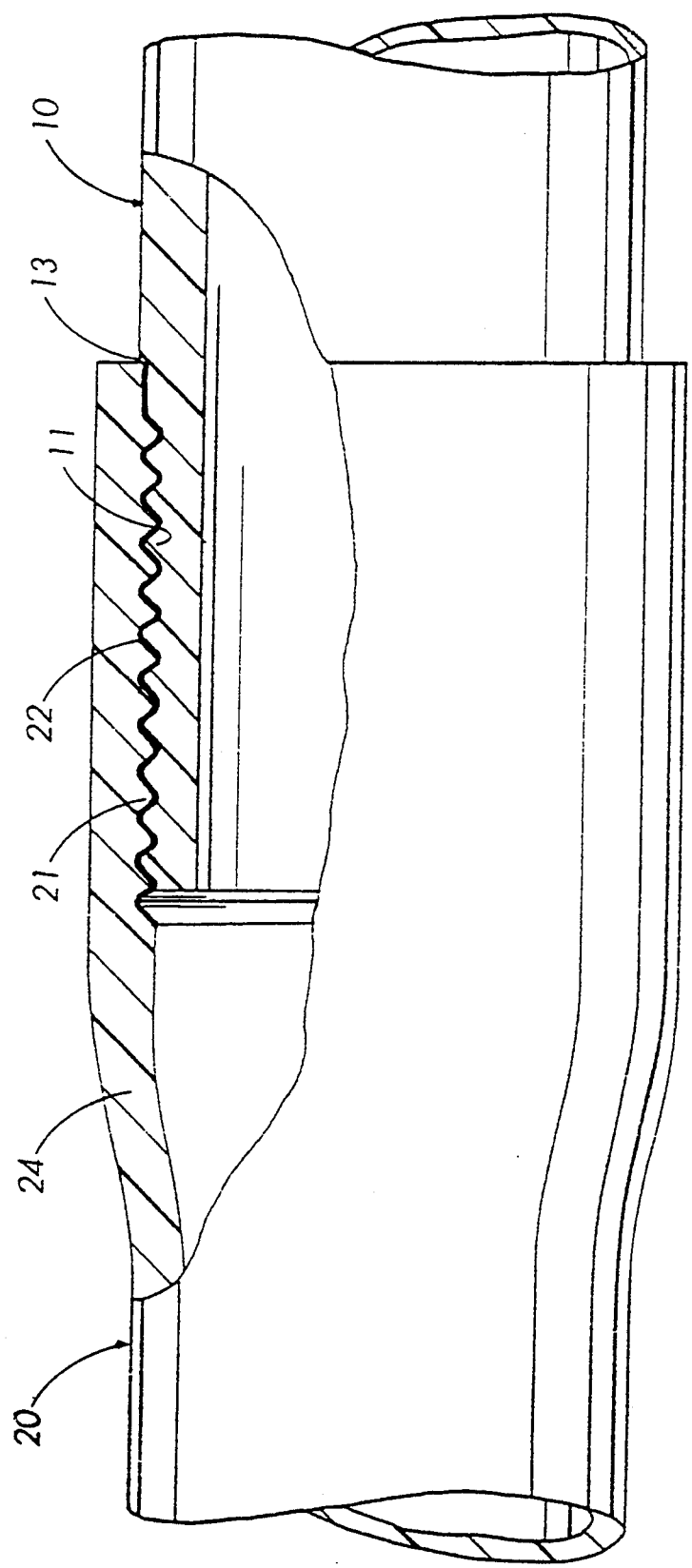
FIG. 1 is a pipe connection of the invention with the box shown in partial section so that the pin can be shown threaded therein.

Referring now to the drawings, wherein like reference characters refer to like or corresponding parts throughout the several figures, FIG. 1 shows a preferred embodiment of the connector of a pipe joint of the invention. A threaded pin (male connector), which is generally referred to by the numeral 10, is shown threaded into a threaded box (female connector), which is generally referred to by the numeral 20. Pin 10 has threads 11 formed thereon, and box 20 has threads 21 formed therein. The threads 11 and 21 correspond so that the pin 10 and box 20 may be threaded together.

According to a preferred embodiment of the invention, a layer 22 of carbon fiber reinforced plastic is formed on the female threads 21 of the box connector 20. The body of each tubular is formed of fiberglass reinforced plastic, and the male threads 11 on the pin 10 are also formed of fiberglass reinforced plastic.

The different materials of the male and female threaded connectors inherently help to eliminate galling and reduce thread wear. The pin and box pipe joint connection of the invention allows composite pipe joints to be threaded together with a suitable thread sealant to form an effective pressure-tight seal over a wide range of torque values including high torque values without galling of the threads. The carbon fibers also reduce the wear between the male and female threads of the box 20 and pin 10 because the carbon of the fibers is lubricous.

The high torque values and broad range of torque values suitable for the pipe joint connectors allows the pipe joint connection to be made-up to position, rather than to torque. Therefore, the pipe connection may include a shoulder, such as shoulder 13 on pin 10, up to which point the pin 10 may be threaded into box 20 without galling the threads 11 and 21. Alternatively, indicia may be used on at least one of the pin 10 and box 20 to indicate the full make-up position for the pipe joint.

Figure 2:
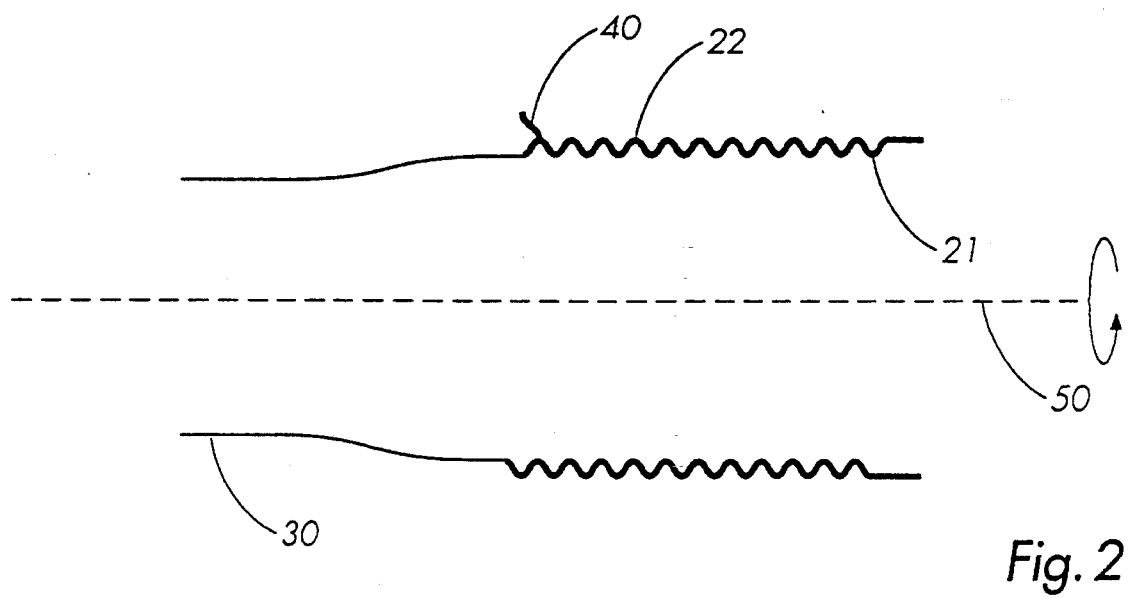
FIG. 2 is a section view showing a mandrel having male threads formed thereon being rotated so that carbon fibers wetted with resin may be wound onto the threads of the mandrel, thereby forming the layer of carbon fiber reinforced plastic on the threads of the box.
Figure 3:
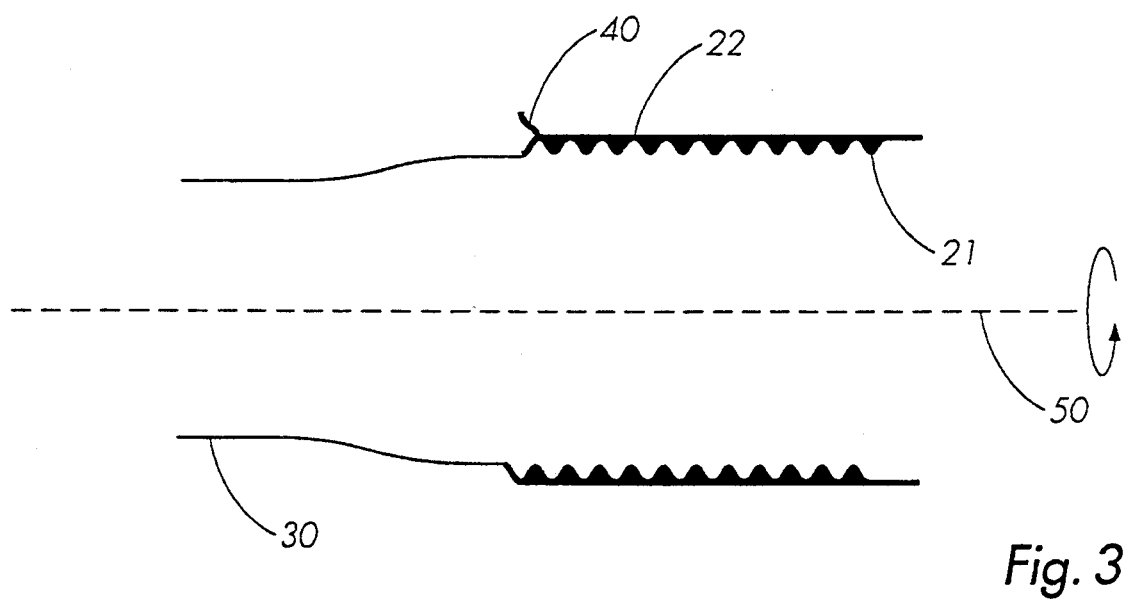
FIG. 3 is a section view similar to FIG. 2 except that the layer of carbon fiber reinforced resin is being formed to completely fill the grooves of the threads on the mandrel thereby forming the female threads of the box connector.

By referring to FIGS. 2 and 3 of the drawings, a preferred method of construction will be described. The carbon fibers 40 are first wetted with a resin by passing the fibers through a resin bath or other suitable means, then wound onto the thread forms of a steel mandrel 30 as the mandrel is rotated about its axis 50. Preferably, the band of carbon fibers is moved along the length of the threads of the mandrel 30 to uniformly cover the mandrel thread forms. As shown in FIG. 3, the layer 22 of carbon fibers and resin may as desired be built up to completely fill the grooves of the threads on the mandrel. Once the layer 22 has been applied, the carbon fiber 40 is cut loose from the fiber on the mandrel 30.

Figure 4:
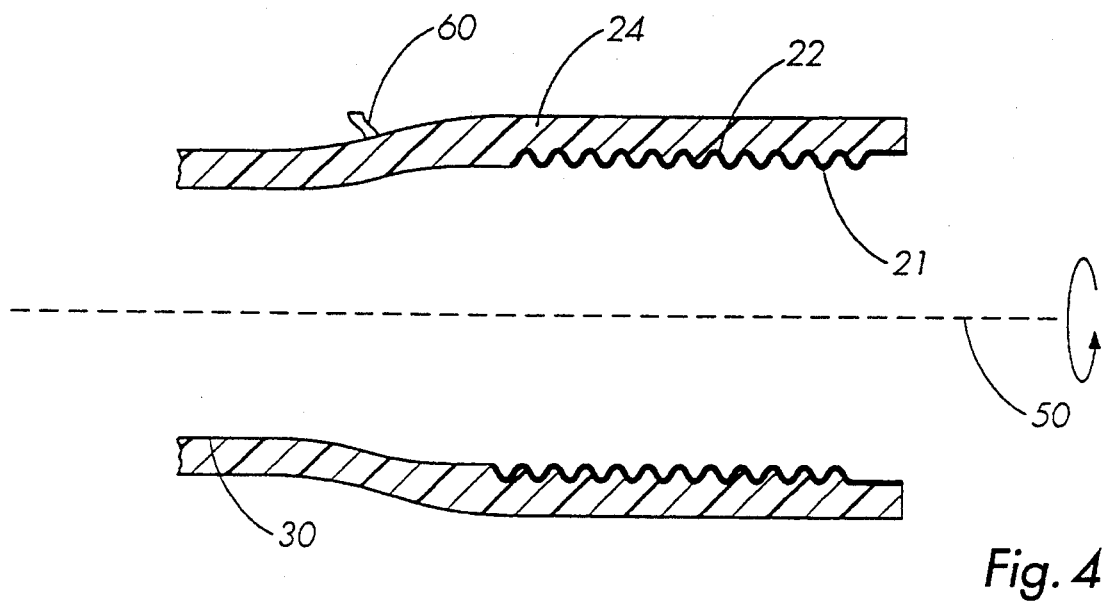
FIG. 4 is a section view showing the composite body of the tubular pipe joint being formed by winding glass fibers wetted with resin over the layer of carbon fiber and resin and over the length of the tubular mandrel.

It is believed that the thickness of the layer 22 is not material to the effectiveness of the layer of carbon fiber reinforced plastic. As shown in FIGS. 2 and 4, a thin layer 22 performs the intended function.

Figure 5:
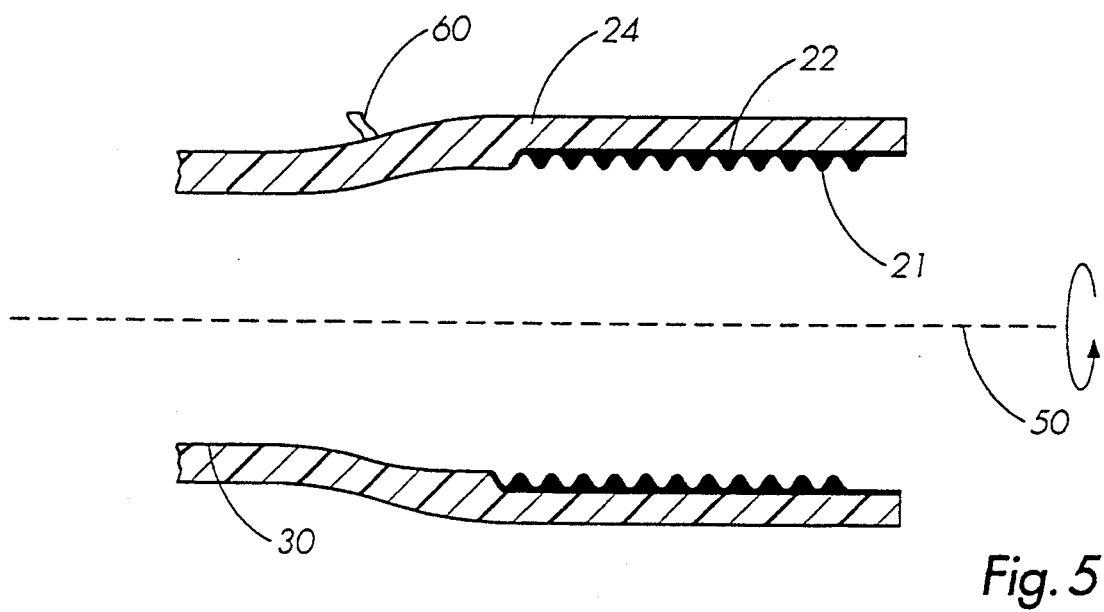
FIG. 5 is a section view similar to FIG. 4 except that the layer of carbon fiber reinforced resin completely forms the female threads of the connection.

Alternatively, as shown in FIGS. 3 and 5, the layer 22 may be used to completely form the threads 21 of box 20. A thin, uniform layer 22 is more difficult to form than a thick layer, but because of the present cost of carbon fiber relative to glass fiber, it is desirable to form a thin layer 22.

FIGS. 4 and 5 illustrated the next forming step. The layer 22 of carbon fibers wetted with resin is then covered with a layer of glass fibers 60 wetted with resin. This step preferably occurs while the layer 22 is still uncured. The steel mandrel 30 is rotated about its axis 50 to wind the glass fiber 60 wetted with resin over the layer 22 of carbon fiber and resin in the thread area and then over the entire length of the mandrel, forming a layer 24 of fiberglass and resin, which forms the complete fiberglass reinforced pipe joint. As shown in FIG. 4, the layer 24 of glass fibers and resin overlays a relatively thin layer 22 of carbon fibers and resin. As shown in FIG. 5, the layer 24 of glass fibers and resin overlays a relatively thick layer 22 of carbon fibers and resin. The layer 24 of glass fibers and resin is applied to form a suitable thickness for the body of the pipe joint.

After the glass fibers and resin have been wound onto the mandrel 30, the complete pipe joint is properly cured. The resulting body of the pipe joint, including the box connector and the carbon fiber reinforced plastic formed on the threads thereof, is thereby integrally formed. A pin connector may be formed at the other end of the tubular, by machining threads into the fiberglass reinforced plastic body 24, for example.

Another method of forming the layer of carbon fiber reinforced plastic on the threads of the box connector is to preform a sleeve of carbon fiber reinforced plastic. Referring to FIGS. 2 and 3 of the drawings, the alternative method of construction will be described. The carbon fibers 40 are first wetted with a resin by passing the fibers through a resin bath or other suitable means and then wound onto the thread forms of a steel mandrel 30 as the mandrel is rotated about its axis 50. Preferably, the band of carbon fibers is moved along the length of the threads of the mandrel 30 to uniformly cover the mandrel thread forms. As shown in FIG. 3, the layer 22 of carbon fibers and resin may as desired be built up to completely fill the grooves of the threads on the mandrel. Once the layer 22 has been applied, the carbon fiber 40 is cut loose from the fiber on the mandrel 30.

The layer 22 of carbon fibers and resin is then properly cured to form a sleeve. The outer walls of the sleeve are sandblasted, machined, or otherwise texturized so that the sleeve will bond to resin material. The sleeve is removed from the mandrel 30.

Referring to FIGS. 4 and 5, the preformed layer 22 (a sleeve) of carbon fiber reinforced plastic may be threaded onto a steel mandrel 30 having male threads at one end. For the purposes of the alternative method of forming the layer 22 of carbon fiber reinforced plastic on the threads of the female connector, the mandrel 30 in FIGS. 4 and 5 may be at a different location from the mandrel shown in FIGS. 2 and 3 so that the layer 22 does not have to be formed at the same time or location as the body 24 of the completed tubular. Then glass fibers 60 are wetted with resin and wound over the preformed sleeve 22 of carbon fiber reinforced plastic and over the length of the mandrel to form a layer 24 of a predetermined thickness. Such layer 24 of glass fibers and resin forms the body of the female connector and the body of the tubular. The complete tubular is then properly cured and the mandrel 30 is removed from the cured tubular. A pin connector may be formed at the other end of the tubular.

In an alternative embodiment of the invention, the layer of carbon fiber reinforced plastic may be formed on the threads of the pin connector. A removable tubular mandrel is rotated about its axis while glass fibers are wetted with resin and wound over the length of the mandrel to form a layer of a predetermined thickness. This first layer of glass fibers and resin forms the composite body of the tubular. Thereafter, carbon fibers are wetted with resin and wound over the first layer at one end of the mandrel. The layer of carbon fibers may be built up to a predetermined thickness. The fibers and resin are then properly cured. The layer of carbon fiber reinforced plastic formed at one end of the tubular is formed into the male threads of a pin connector. Preferably, the threads are formed after curing by machining into the layer of carbon fiber reinforced plastic material.

It is anticipated that the layer of carbon fiber reinforced plastic on the threads of the pin connector also may be formed according to another method. A removable tubular mandrel is rotated about its axis while glass fibers are wetted with resin and wound over the length of the mandrel to form a layer of a predetermined thickness. This first layer of fibers and resin forms the composite body of the tubular. Thereafter, the tubular is properly cured. One end of the tubular is machined so that a preformed sleeve may be bonded thereto. The preformed sleeve has male threads formed thereon. Preferably, the entire sleeve is formed of carbon fiber reinforced plastic.

The preformed sleeve may be formed in a manner similar to that described for forming the layer of carbon fiber and resin directly onto the composite material of the tubular. A mandrel is configured to match the shape of the machined end of a composite tubular onto which the sleeve is to be placed. A mandrel is rotated about its axis while carbon fibers are wetted with resin and wound around the mandrel to form a layer of a predetermined thickness. The carbon fibers and resin are properly cured, and the sleeve is removed from the mandrel. The outer walls of the sleeve are formed into the threads of a pin connector. Preferably, the threads are formed after curing by machining into the layer of carbon fiber reinforced plastic.

The preformed sleeve is then placed over the machined end of the composite tubular and adherently bound thereto.

The method of using a preformed sleeve may be adapted, for example, to retrofitting composite tubulars with a connector having male threads with a layer of carbon fiber and resin. The male threads of an existing composite tubular are machined away. The preformed sleeve is then placed over the machined end of the tubular and adherently bound thereto.

To facilitate removal of the tubular or sleeve from the mandrel after curing, in the preferred embodiments a suitable release agent is applied to the mandrel 30 before any carbon fibers or fiberglass with resin is applied to the mandrel.

Carbon fibers and fiberglass may be used in the form of roving, which is a bundle of filaments, or tape, which is a woven fabric of filaments. Both carbon fiber roving and tape and fiberglass roving are well known in the art and commercially available. For example, carbon roving is commercially available under the trade name GRAFIL, from Courtaulds Grafil, Inc., 5900 88th Street, Sacramento, Calif.

The resin for wetting the carbon fibers and glass fibers and for bonding the fibers together is epoxy, polyester, or vinylester resin. The resin may include a suitable curing agent. Typical curing agents include amines and anhydrides. Polyester or vinylester resins may include a suitable accelerator.

In the preferred embodiments, the resin and curing agent used for the carbon fiber and the glass fiber are the same, but different resins and curing agents may be selected for the carbon and glass fibers if it is deemed expedient to do so.

It is to be understood that the foregoing discussion refers to a detailed description of a preferred embodiment and that alterations and modifications from that shown can be made without departing from the spirit and scope of the invention as defined by the appended claims.

I claim:

1. A pipe joint for use in oil field applications such as down-hole tubing comprising:
   (a) a generally tubular body comprising composite material;
   (b) a pin connector formed on one end of said tubular body, said pin connector having threads formed on the exterior thereof, said threads of said pin connector having at least a surface layer thereof comprising a composite material other than carbon fiber reinforced plastic; and
   (c) a box connector formed on the other end of said tubular body, said box connector having threads formed on the interior thereof, said threads of said box connector corresponding to said threads of said pin connector, and said threads of said box connector having at least a surface layer thereof comprising carbon fiber reinforced plastic being formed of wound continuous carbon fibers and resin, whereby the different surface materials of said threads of said pin and box connectors and the lubricous property of said carbon fibers reduces galling and wear during make-up or break-out of the pipe joint with another pipe joint.

2. A pipe joint for use in oil :field applications such as down-hole tubing comprising:
   (a) a generally tubular body comprising composite material;
   (b) a pin connector formed on one end of said tubular body, said pin connector having threads formed on the exterior thereof, said threads of said pin connector having at least a surface layer thereof comprising a composite material other than carbon fiber reinforced plastic;
   (c) a box connector formed on the other end of said tubular body, said box connector having threads formed on the interior thereof, said threads of said box connector corresponding to said threads of said pin connector, and said threads of said box connector having at least a surface layer thereof comprising carbon fiber reinforced plastic being formed of wound continuous carbon fibers and resin, whereby the different surface materials of said threads of said pin and box connectors and the lubricous property of said carbon fibers reduces galling and wear during make-up or break-out of the pipe joint with another pipe joint; and
   (d) a shoulder formed on said pin connector beyond which said pin connector cannot be threaded together with the box connector of another pipe joint to provide a mechanical stop at the final make-up position whereby an effective pressure-tight seal for down-hole tubing is made up to position.

3. A pipe joint for use in oil field applications such as down-hole tubing comprising:
   (a) a generally tubular body comprising composite material;
   (b) a pin connector formed on one end of said tubular body, said pin connector having threads formed on the exterior thereof, said threads of said pin connector having at least a surface layer thereof comprising a composite material other than carbon fiber reinforced plastic;
   (c) a box connector formed on the other end of said tubular body, said box connector having threads formed on the interior thereof, said threads of said box connector corresponding to said threads of said pin connector, and said threads of said box connector having at least a surface layer thereof comprising carbon fiber reinforced plastic being formed of wound continuous carbon fibers and resin, whereby the different surface materials of said threads of said pin and box connectors and the lubricous property of said carbon fibers reduces galling and wear during make-up or break-out of the pipe joint with another pipe joint; and
   (d) indicia on said pin connector to mark the final make-up position for the connection formed by threading said pin connector to the box connector of another pipe joint, whereby an effective pressure-tight seal for down-hole tubing is made up to position.

4. A pipe joint according to claim 3, wherein said composite material of said tubular body and said threads of said pin connector is fiberglass reinforced plastic.

5. A pipe joint according to claim 3, wherein said carbon fibers are in the form of roving.

6. A pipe joint according to claim 3, wherein said carbon fibers are in the form of woven tape.

* * * * *